(12) United States Patent
Meinsen

(10) Patent No.: US 8,195,604 B2
(45) Date of Patent: Jun. 5, 2012

(54) SYSTEM AND METHOD FOR VERIFYING IMS DATABASES ON A MAINFRAME COMPUTER

(75) Inventor: David Meinsen, Independence, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 487 days.

(21) Appl. No.: 12/392,346

(22) Filed: Feb. 25, 2009

(65) Prior Publication Data

US 2010/0228717 A1 Sep. 9, 2010

(51) Int. Cl.
*G06F 7/00* (2006.01)
(52) U.S. Cl. ........................................ 707/609
(58) Field of Classification Search .................. 707/609, 707/610, 612
See application file for complete search history.

(56) References Cited

U.S. PATENT DOCUMENTS

| 7,231,408 | B2 * | 6/2007 | Belcaid et al. | 1/1 |
| 2002/0181736 | A1 * | 12/2002 | Seder et al. | 382/100 |
| 2005/0138401 | A1 * | 6/2005 | Terao et al. | 713/189 |
| 2010/0169296 | A1 * | 7/2010 | King et al. | 707/706 |

* cited by examiner

*Primary Examiner* — Angela Lie
(74) *Attorney, Agent, or Firm* — Swanson & Bratschun, L.L.C.

(57) ABSTRACT

A system and method for ensuring existence all IMS database components operating on a mainframe computer may include a storage unit configured to store multiple IMS databases and multiple respective sets of IMS database components. A processing unit may be in communication with the storage unit. Software, when executed on the processing unit, may cause the processing unit to (i) access multiple IMS database libraries, (ii) identify each set of IMS database components that is missing at least one IMS database component in the IMS database libraries, and (iii) generate a report listing each set of IMS database components missing at least one IMS database component.

16 Claims, 4 Drawing Sheets

SYSTEM AND METHOD FOR VERIFYING IMS DATABASES ON A MAINFRAME COMPUTER

BACKGROUND

Mainframe computers are significantly different computing environments than are other types of computers, such as personal, mini, and mid-range computers. Mainframe computers are generally more powerful than other computer types in that they have faster processors, wider buses, and larger storage devices, for example.

Despite the power of mainframe computers, mainframe computers tend to be more labor intensive than our other programming environments due to operating system functionality. Software, such as database systems, that operate on mainframe computers have to comply with the operating system that controls the mainframe computer.

Information Management System (IMS) databases, which are hierarchical databases as opposed to relational databases, are formed of an IMS database and IMS database components that are configured to maintain proper operation of the database. IMS is a software product produced by International Business Machines (IBM®).

Each IMS database system includes five IMS database components, including: (i) an IMS system macro that defines the database to the online IMS systems; (ii) database definition (DBD) that defines the structure of the database; (iii) delete/define system that contains statements to define datasets of the database; (iv) dynamic allocation member that defines the database datasets to the online IMS system; and (v) database recovery control (DBRC) that is used by IMS to record event association with the database recovery. If any of these five IMS database components is missing, then the IMS database will not function correctly.

A typical mainframe computer may operate thousands or tens of thousands of databases. System administrators who are charged with maintaining IMS databases may find themselves having to create, delete, and modify IMS databases on a daily basis. As understood in the art, system administrators may create new IMS database components, delete IMS database components, and edit IMS database components associated with each of the IMS databases. In creating and deleting IMS database components, system administrators routinely inadvertently forget to create one, which means that the database may not operate properly or expose the database to unrecoverable situations in the event of a corrupted or crashed database. For example, if a DBRC IMS database component is not created, the IMS database cannot be recovered should the IMS database crash or become corrupted. In addition, database administrators who delete IMS databases routinely inadvertently forget to delete all of the IMS database components. While not deleting all the IMS database components does not cause other databases to fail, it does clutter IMS database libraries, which causes inefficiencies.

After many years and tens of thousands of databases, system administrators often find themselves virtually helpless to resolve the IMS database problems resulting from forgetting to create or delete IMS database components as several man-years of work would be required to correct the problems. It is often too late to save a malfunctioning database in the event of an IMS database failing, which results in very costly and time consuming problems for the system administrators.

SUMMARY

To overcome the problems of managing IMS databases on mainframe computers, the principles of the present invention provide for automation of verifying IMS components of IMS databases. A system and method for verifying that each of the IMS database components may be utilized to assist system administrators for managing and maintaining IMS databases. If any of the IMS database components is determined to be missing, then a report may be generated for the system administrator to determine whether the IMS database is currently being utilized by users or whether the IMS database has become obsolete. The system administrator may either create the missing IMS database component(s) or delete each of the other IMS database components that were inadvertently not deleted.

One embodiment of a system and method for ensuring existence all IMS database components operating on a mainframe computer may include a storage unit configured to store multiple IMS databases and multiple respective sets of IMS database components. A processing unit may be in communication with the storage unit. Software, when executed on the processing unit, may cause the processing unit to (i) access multiple IMS database libraries, (ii) identify each set of IMS database components that is missing at least one IMS database component in the IMS database libraries, and (iii) generate a report listing each set of IMS database components missing at least one IMS database component.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
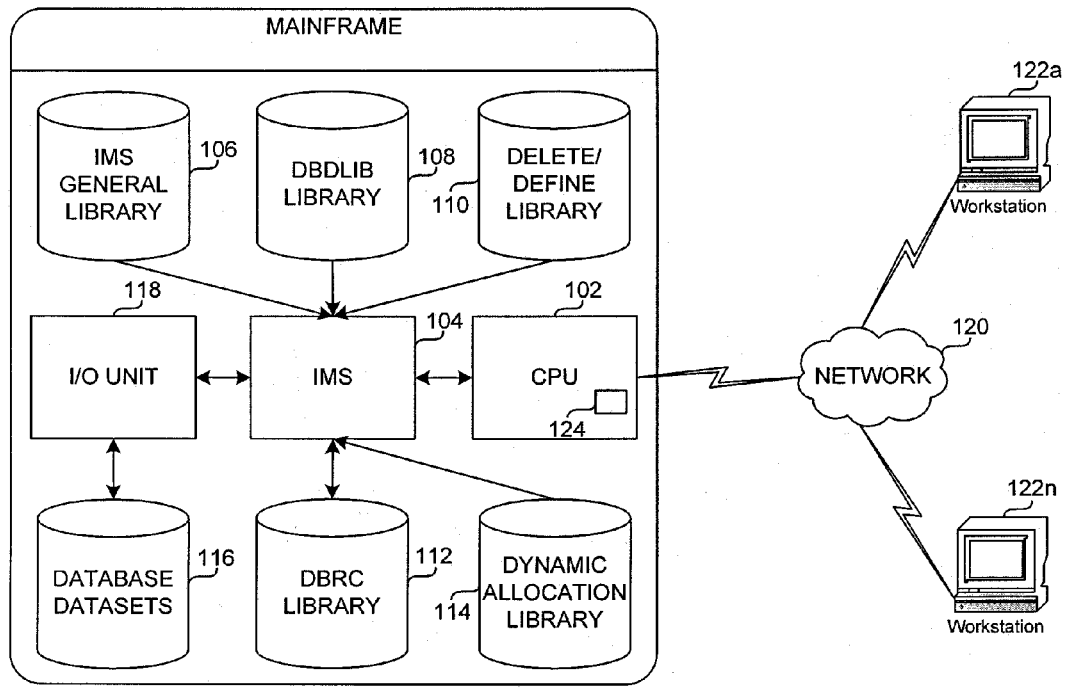
FIG. 1 is an illustration of an illustrative mainframe computer network configured to manage an IMS database in accordance with the principles of the present invention.

With regard to FIG. 1, a mainframe computer 100 includes a central processing unit (CPU) or processing unit 102 that includes one or more computer processors, as understood in the art. The processing unit 102 may be configured to execute or be in communication with an IMS system 104, which, as understood in the art, is a software program that operates to manage IMS databases that are hierarchically configured. The IMS system 104 includes multiple IMS database libraries that store IMS database components that operate to manage proper operation of an IMS database. The IMS database libraries include (i) IMS GEN library 106, (ii) database definition (DBD) library 108, (iii) delete/define library 110, (iv) database recovery control library (DBRC) 112, and (v) dynamic allocation library 114. Each of the libraries 106-114 include IMS database components, which, if any of the IMS database components are missing, the database with which the IMS database components are associated will not function correctly or be at risk in the event of a database crash or malfunction.

IMS database datasets 116 may be accessed via an input/output (I/O) unit 118 by the IMS system 104. The IMS system 104 controls access to the database and prevents multiple updates to the same database record at the same time through a network 120, which may be a local or wideband network, by users of workstations 122a-122n (collectively 122). The IMS system 104 may also be configured to log all updates to database records for recoverability and records IMS log datasets used for a database in the DBRC library 112.

The IMS database libraries 106-114 are shown to be distinct from one another. Each of the IMS database libraries 106-114 is configured to store executable object code compiled from source code of IMS database components, as understood in the art. Each database that is managed by the IMS system 104 has an IMS database component stored in each of the IMS database libraries 106-114. As such, and which is typical, each IMS database component associated with a single IMS database has the same name, but different suffix. By having the same name, a system administrator or database administrator may more easily determine which IMS database components are associated with which IMS databases. In an alternative embodiment, a different name for each IMS database component may be utilized and managed in another database. Although shown as five separate IMS database libraries 106-114, it should be understood that the IMS database libraries 106-114 may be combined into one or more IMS database libraries and each of the IMS database components may be logically separated by suffixes or otherwise to enable an IMS database administrator to manage the IMS database components. The IMS database libraries may be folders, databases, data repositories, or any other type of library that may be utilized to store IMS database components, as understood in the art of mainframe computers.

Software 124 may be executed by the central processing unit 102 to enable an IMS database administrator to ensure that each IMS database has the proper number of IMS database components to ensure proper operation of each respective IMS database. The software 124 may be in communication with the IMS system 104, which, too, may be executed by the processing unit 102, or communicate directly with each of the IMS database libraries 106-114. Functionality and configuration of the software 124 is described herein below.

Figure 2:
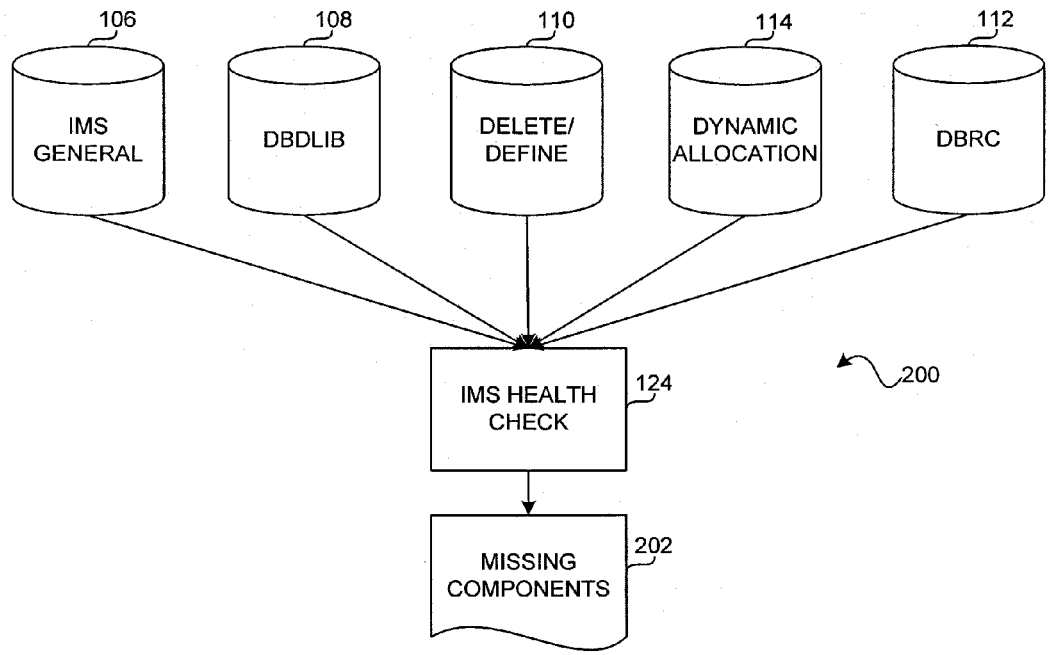
FIG. 2 is a block diagram of IMS database libraries and a software program configured to interact with the IMS database libraries to determine whether any IMS database components are missing.

With regard to FIG. 2, an illustrative block diagram of a configuration 200 of IMS database libraries 106-114 in communication with software 124 is shown. The software 124 may be termed "IMS health check" software, as the software 124 is configured to determine "health" of each IMS database by ensuring that each IMS database has associated IMS database components in each of the IMS database libraries 106-114. In other words, the software 124 is configured to verify that each IMS database library has an IMS database component associated with each IMS database, thereby being properly configured from a completeness standpoint to ensure proper operation of each IMS database.

The IMS health check software 124 may be configured to communicate with each of the IMS database libraries 106-114 directly or indirectly in the case of communicating via the IMS system 104 (FIG. 1). In one embodiment, the IMS health check software 124 may be configured to automatically execute once per time period, such as monthly, to determine whether any IMS database components were inadvertently not added or deleted from an IMS database library. In either event, the IMS health check software 124 may determine that there are fewer than five related IMS database components associated with each IMS database. In one embodiment, the IMS health check software 124 may count IMS database components with the same name, not including suffixes, in the IMS database libraries to ensure that each set of IMS database components has a total of five. In an alternative embodiment, the IMS health check software 124 may be configured to look up a name of an IMS database and then ascertain whether each of the IMS database libraries 106-114 has an IMS database component with the same name (not including suffix). A report 202 may include a list of missing IMS database components or list an indicia of a set of IMS database components to enable an IMS database administrator to easily determine which IMS databases are not functioning properly due to missing one or more IMS database components. In addition, the report 202 may notify an IMS database administrator that an IMS database that has been deleted did not have each of the associated IMS database components deleted from the IMS database libraries 106-114, thereby assisting the IMS database administrator in maintaining less cluttered IMS database libraries 106-114. As there may be thousands or tens of thousands of IMS databases, ensuring that each IMS database is properly functioning by ensuring that the correct number of IMS database components exist in the IMS database libraries 106-114 may be what prevents a catastrophic failure of one ort more IMS databases.

Figure 3:
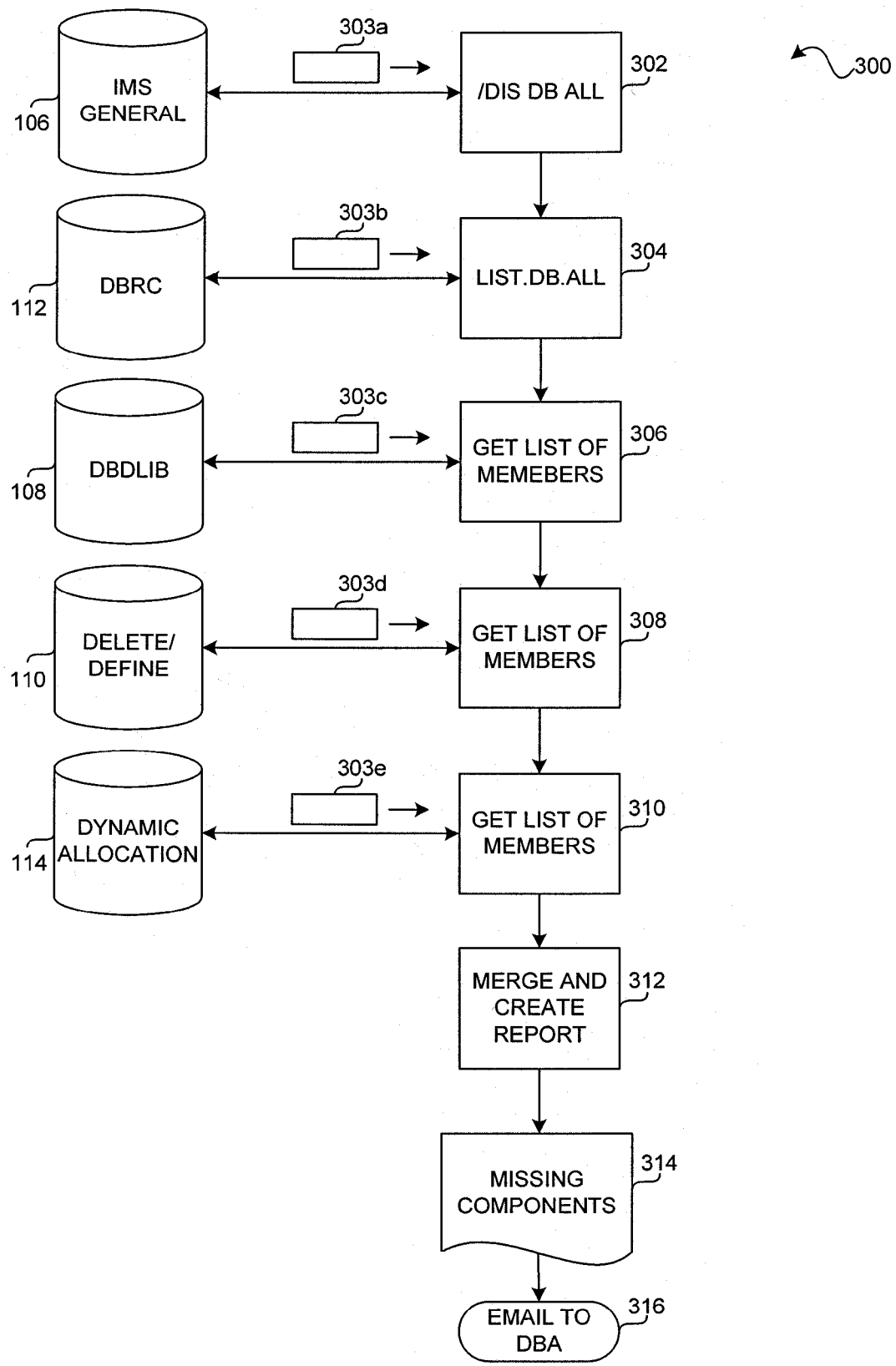
FIG. 3 is a block diagram of a process for processing IMS database components in the IMS database libraries to determine whether any IMS database components are missing.

With regard to FIG. 3, a block diagram of an illustrative process 300 is shown to interact with each of the IMS database libraries 106-114. The process 300 starts at step 302, where a request is made of the IMS GEN library 106 to collect or display each of the IMS database components 303a in the IMS GEN library 106. At step 304, a request is made of the DBRC library 112 to list each of the IMS database components 303b stored therein. At step 306, a request may be made of the DBD library 108 to list each of the members or IMS database components 303c stored therein. At step 308, a request may be made of the delete/define library 110 to list each of the members or IMS database components 303d stored therein. At step 310, a request may be made to the dynamic allocation library 114 to obtain a list of members or IMS database components 303e stored therein.

At step 312, each of the lists of IMS database components 303a-303e from the IMS database libraries 106-114 may be merged and a report may be created. The merging of the IMS database components may be created by appending each of the IMS database components 303a-303e listed from each of the IMS database libraries 106-114. In creating the report, the merged IMS database components listing may be sorted and each of the IMS database components with the same name may be counted. The result of the count may be used to create a missing components report 314, which lists an indicia of a set of IMS database components that have fewer than five IMS database components listed from the IMS databases 106-114. In another words, if the number of IMS database components having the same name from each of the IMS databases 106-114 is fewer than five but greater than zero, then an indicia (i.e., name or otherwise) may be listed in the missing IMS database components report 314. Conversely, a report may be created to list each of the complete sets of IMS database components. At step 316, an e-mail may be sent to an IMS database administrator with the missing IMS database components report 314. The IMS database administrator may view the missing IMS database components report and take action to add any missing IMS database components or delete superfluous IMS database components that were not deleted when an IMS database became inactive or otherwise deleted.

Figure 4:
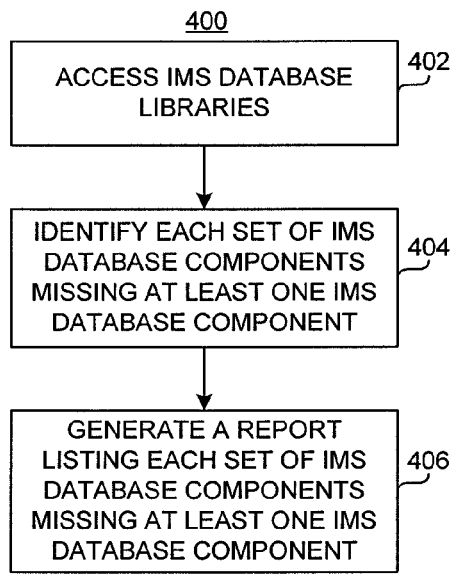
FIG. 4 is a flow diagram of an illustrative process for ensuring existence of all IMS database components.

With regard to FIG. 4, a flow diagram of an illustrative process for assisting an IMS database administrator in ensuring existence of all IMS database components is shown. At step 402, IMS database libraries may be accessed. In accessing the IMS databases, a request may be made to each of the IMS databases to extract or otherwise list each of the IMS database components listed in the IMS database libraries. At step 404, each set of IMS database components missing at least one IMS database component may be identified. The identification may be made in a number of ways. For example, a count of each IMS database component having the same name, not including any suffixes, may be made and, if the count is less than five and greater than zero, then the set of IMS database components may be identified as missing an IMS database component. In an alternative embodiment, each IMS database library may be individually accessed at step 402 to determine whether a particular IMS database component is listed in each of the individual IMS database libraries. If it is found that at least one IMS database library does not include a particular IMS database component, then that set of IMS database components may be identified as missing at least one IMS database component. At step 406, a report listing each set of IMS database components missing at least one IMS database component may be listed. The report may be generated on a computer and e-mailed or printed so that an IMS database administrator may access and view the sets of IMS database components that are missing at least one IMS database component. It should be understood that any other type of report may be generated and made available to an IMS database administrator. The IMS database administrator may thereafter utilize the IMS database report to correct any missing IMS database components or delete any extraneous IMS database components listed in the IMS database report.

Figure 5:
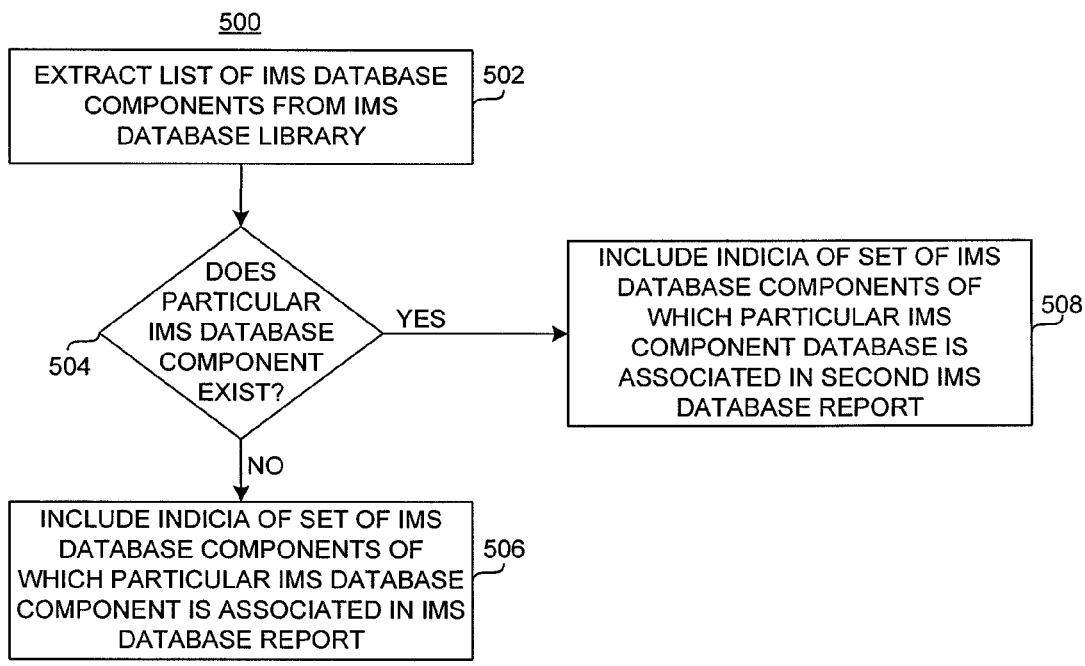
FIG. 5 is a flow diagram of an illustrative process for determining whether a particular IMS database component exists.

With regard to FIG. 5, a flow diagram of an illustrative process 500 for ensuring that each set of IMS database components is complete. The process 500 starts at step 502, where a list of IMS database components may be extracted from an IMS database library. At step 504, a determination may be made as to whether a particular IMS database component exists in the IMS database library. If it is determined that the particular IMS database component does not exist in the IMS database library, then the process continues at step 506, where an indicia of the set of IMS database components of which the particular IMS database component is associated may be included in a first report. Alternatively, if it is determined at step 504 that the particular IMS database component exists, then at step 508, an indicia of the set of IMS database components of which the particular IMS database component is associated may be included in a second IMS database report.

Figure 6:
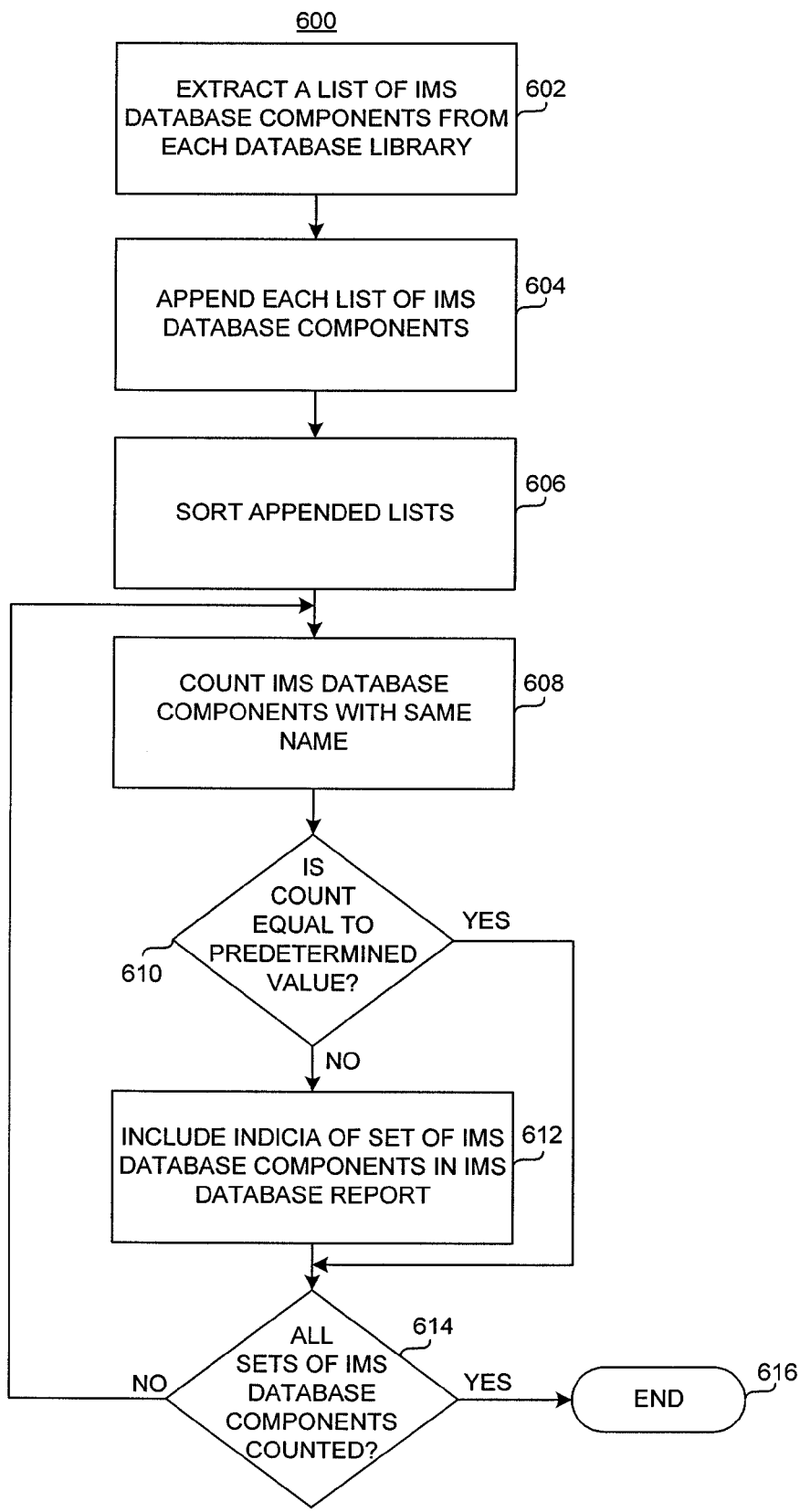
FIG. 6 is a flow diagram of an illustrative process for ensuring that each IMS database component exists.

With regard to FIG. 6, a flowchart of an illustrative process 600 for ensuring that each IMS database component of a set of IMS database components associated with an IMS database is provided. The process starts at step 602, where a list of IMS database components may be extracted from each IMS database library. At step 604, each list of IMS database components may be appended or otherwise merged. At step 606, the appended lists may be sorted. By sorting the appended lists, each set of IMS database components may be grouped together, thereby simplifying and speeding up a count of each set of IMS database components. At step 608, IMS database components with the same name may be counted. The same name may mean that the name, not including a suffix, may be counted. At step 610, a determination as to whether the count is equal to a predetermined value may be made. In one embodiment, the predetermined value is the number five, as there are five IMS database components currently utilized for use in operating an IMS database. In the future, the number of IMS database components used to operate an IMS database may change, which would cause the predetermined value to change, accordingly. If it is determined that the count does not equal to the predetermined value, then the process continues at step 612, where an indicia of a set of IMS database components that does not have a count equal to the predetermined value may be included in an IMS database report. At step 614, a determination may be made as to whether all sets of IMS database components have been counted. If not, then the process loops back to step 608, where a next set of IMS database components with the same name is counted. Otherwise, the process ends at step 616. If it was determined that at step 610 that the count is equal to the predetermined value, then the process skips step 612 and continues at step 614. Alternatively, a step (not shown) may be included to include an indicia of a set of IMS database components in a second IMS database report so that an IMS database administrator may see each set of IMS database components that is complete.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

The invention claimed is:

1. A system for ensuring existence all information management system (IMS) database components, a system comprising:
    on a mainframe computer:
        a storage unit configured to store a plurality of IMS databases and a plurality of sets of IMS database components, each set of IMS database components operable to manage a respective IMS database;
        a processing unit in communication with said storage unit; and
        software, when executed on said processing unit, causes said processing unit to:
            access a plurality of IMS database libraries;
            extract a list of IMS database components from each of the IMS database libraries;
            append each list of IMS database components from each of the IMS database libraries;
            sort the appended lists;
            count the total number of IMS database components with the same name not including suffixes;
            determine that the total number of IMS database components with the same name not including suffixes is a predetermined value;
            identify each set of IMS database components that is missing at least one IMS database component in the IMS database libraries from the sorted, appended lists of IMS database components; and
            generate a report listing each set of IMS database components missing at least one IMS database component.

2. The system according to claim 1, wherein said software, when executed by said processing unit, is further configured to cause said processing unit to:
    determine, from at least one of the extracted lists of IMS database components, whether a particular IMS database component exists; and
    in response to determining that the particular IMS database component does not exist, including an indicia of the particular IMS database component in the report.

3. The system accordingly to claim 1, wherein the predetermined value is 5.

4. The system accordingly to claim 1, wherein said software, when executed by said processing unit, is further configured to cause said processing unit to count only one of each type of IMS database component.

5. The system accordingly to claim 1, wherein said software, when executed by said processing unit, is further configured to cause said processing unit to access, identify, and generate on a periodic basis.

6. The system accordingly to claim 5, wherein the periodic basis is once per month.

7. The system accordingly to claim 1, wherein said software, when executed by said processing unit, is further configured to cause said processing unit to:
   identify each set of IMS database components that are complete; and
   generate a report listing each complete set of IMS database components.

8. The system accordingly to claim 1, wherein said software, when executed by said processing unit, is further configured to cause said processing unit to identify any IMS database components that have been added or deleted since said software was previously executed by said processing unit.

9. A method for ensuring existence of all information management system (IMS) database components, said method comprising:
   on a mainframe computer:
      accessing a plurality of IMS database libraries;
      extracting a list of IMS database components from each of the IMS database libraries;
      appending each list of IMS database components from each of the IMS database libraries;
      sorting the appended lists;
      counting a total number of IMS database components with the same name; and
      determining that the total number of IMS database components with the same name is a predetermined value;
      identifying each set of IMS database components that is missing at least one IMS database component in the IMS database libraries from the sorted, appended lists of IMS database components; and
      generating a report listing each set of IMS database components missing at least one IMS database component for notifying a database administrator.

10. The method according to claim 9, further comprising:
    determining, from at least one of the extracted lists of IMS database components, whether a particular IMS database component exists;
    in response to determining that the particular IMS database component does not exist, including an indicia of the particular IMS database component in the report.

11. The method accordingly to claim 9, wherein the predetermined value is 5.

12. The method accordingly to claim 9, further comprising counting only one of each type of IMS database components.

13. The method accordingly to claim 9, wherein accessing, identifying, and generating is performed on a periodic basis.

14. The method accordingly to claim 13, wherein the periodic basis is once per month.

15. The method accordingly to claim 9, further comprising:
    identifying each set of IMS database components that are complete; and
    generating a report listing each complete set of IMS database components.

16. The method accordingly to claim 9, further comprising identifying any IMS database components that have been added or deleted since accessing, identifying and generating were last performed.

\* \* \* \* \*